United States Patent
Adams et al.

(10) Patent No.: US 6,527,842 B1
(45) Date of Patent: Mar. 4, 2003

(54) EMULSION INKS

(75) Inventors: John Christopher Adams, Clackmannanshire (GB); John Hamilton, Dunblane (GB)

(73) Assignee: G R Advanced Materials Ltd., Stirling (GB)

( * ) Notice: Subject to any disclaimer, the term of this patent is extended or adjusted under 35 U.S.C. 154(b) by 119 days.

(21) Appl. No.: 09/672,478

(22) Filed: Sep. 28, 2000

(30) Foreign Application Priority Data

Sep. 29, 1999 (GB) .............................................. 9923083

(51) Int. Cl.⁷ .............................................. C09D 11/00
(52) U.S. Cl. .................................. 106/31.26; 106/31.25
(58) Field of Search ............................. 106/31.26, 31.25

(56) References Cited

U.S. PATENT DOCUMENTS

| | | | |
|---|---|---|---|
| 2,839,412 A | 6/1958 | Igler et al. | |
| 5,575,839 A | 11/1996 | Okuda | |
| 5,667,570 A | * 9/1997 | Okuda et al. | 106/31.26 |
| 5,718,748 A | * 2/1998 | Suzuki et al. | 106/31.26 |
| 5,738,715 A | * 4/1998 | Okuda et al. | 106/31.26 |
| 5,779,777 A | 7/1998 | Okuda et al. | |
| 5,880,214 A | * 3/1999 | Okuda | 106/31.13 |
| 5,880,215 A | * 3/1999 | Okuda | 106/31.13 |
| 5,902,388 A | 5/1999 | Matsuura et al. | |
| 5,904,759 A | * 5/1999 | Okuda et al. | 106/31.26 |
| 5,990,230 A | 11/1999 | Muramatsu et al. | |
| 6,066,199 A | * 5/2000 | Adams et al. | 106/287.14 |
| 6,165,258 A | * 12/2000 | Asada | 106/31.26 |

FOREIGN PATENT DOCUMENTS

| | | |
|---|---|---|
| EP | 0 609 076 A2 | 8/1994 |
| EP | 0 791 639 A1 | 8/1997 |
| EP | 0 816 450 A1 | 1/1998 |
| EP | 0 848 046 A1 | 6/1998 |
| GB | 2323847 A | 7/1998 |
| JP | 6-128516 | 5/1994 |
| JP | 09003383 A2 | 1/1997 |
| JP | 10120961 A2 | 5/1998 |

\* cited by examiner

*Primary Examiner*—Helene Klemanski
(74) *Attorney, Agent, or Firm*—Alston & Bird LLP

(57) ABSTRACT

An emulsion ink comprises a continuous oil phase, two or more dispersed liquid phases, one of which is a dispersed oil phase, and a solid material dispersed in the dispersed oil phase. The emulsion ink is suitable for use on a stencil or digital duplicator, and has improved rheological properties.

16 Claims, No Drawings

EMULSION INKS

FIELD OF THE INVENTION

The present invention relates to emulsion inks, particularly for use in stencil duplicators and digital duplicators.

BACKGROUND OF THE INVENTION

Emulsion inks are widely used in stencil duplicators and digital duplicators. The preferred emulsion inks are water-in-oil (w/o) emulsion inks, comprising a water phase dispersed in an oil phase. A wide variety of these kinds of inks is known, some containing colouring agent in the continuous oil phase and others containing colouring agent in the dispersed water phase, depending on the materials used and the properties required in the final ink.

For instance, EP-A-0609076 discloses a w/o emulsion ink comprising a colouring agent in the continuous oil phase and an oil-in-water (o/w) type resin emulsion in the water phase. The minimum film-forming temperature of the o/w type resin emulsion is 40° C. or less. The resulting w/o emulsion ink is stated to have excellent drying properties, sticking tendency and stability.

JP-A-6128516 discloses a variety of emulsion inks comprising an oil phase and a water phase, and a hot-melting component (preferably having a softening temperature in the range 40 to 100° C.) or a thermosetting component in the oil phase and/or the water phase. Said inks are said to have improved drying and binding properties, thereby preventing set-off. The emulsion inks may optionally include a silicone oil in the oil phase and/or the water phase, to prevent offset. However, no information is given as to how the silicone oils may be incorporated into the water phase, and the examples are limited to its inclusion in the oil phase. A colouring agent may also be included in the oil phase.

U.S. Pat. No. 2,839,412 discloses w/o emulsion inks for use on stencil duplicators comprising a water phase dispersed in a continuous oil phase through the use of aluminium stearate as an emulsifying agent, and wherein the water phase comprises a colour pigment. Said inks are said to have good shelf-life and flow properties, amongst other qualities.

However, despite their long standing use, w/o emulsion inks still demonstrate the following shortcomings:

1. There are contradictory requirements regarding the proportion of water phase within the ink. Amongst other properties, the ratio of dispersed water phase to continuous oil phase determines the flow properties of the ink. It is of critical importance to optimise this property. Excessive flow will cause the ink to exude from under the trailing edge of the stencil during the printing process giving rise to unwanted ink marks on the printed sheet, a defect sometimes termed "tail flooding".

In order to prevent this defect the water phase of commercially available w/o emulsion inks is generally greater than 50% of the total ink weight, sometimes greater than 70%. However, as the water content of the ink increases another printing defect becomes more evident. The water component causes swelling of the paper fibres in the printed sheet. This swelling results in a distortion of the paper surface and the raised points in the wet print areas promote transfer of ink to the back of superimposed prints in the receiving tray of the print machine, a defect known as "set-off".

It can be appreciated therefore that, in order to avoid tail flooding problems, inks are formulated with a higher concentration of water than is desirable regarding set-off performance.

2. Inks containing pigments in the water phase can exhibit a variation in properties according to pigment content. One of the perceived advantages of incorporating pigments within the dispersed phase of w/o emulsion inks is the ability to achieve a range of inks with a common formulation in which only the pigment is varied and which consequently exhibit many common or closely similar properties.

For example, EP-A-0848046 describes a system for making a wide range of coloured inks based on this concept. The process entails the preparation of a basic range of aqueous pigment dispersions, and mixing them in different proportions to form components of the water phase of differently coloured inks. However, in such a system there are some properties that do vary with pigment content, particularly in relation to the overall concentration of pigment in the water phase.

For example changes in rheology are apparent as the concentration of a pigment is varied. Thus, as the concentration of a pigment is decreased the resultant prints, particularly those with large block areas, can exhibit an unevenness of ink laydown, typically lateral bands of increased print density. This defect is exacerbated as the ambient temperature increases. This change in rheology can be characterised by use of a rheometer capable of performing a creep test in which viscosity is measured with application of a boost shear stress. Inks which exhibit this defect of uneven ink distribution have significantly lower creep viscosities than inks with higher concentrations of pigment which do not give rise to the defect, even though viscosities measured under normal conditions show little difference.

3. Inks containing polar pigments, such as azo lakes, in the water phase can show poor stability. Thus EP-A-0791639, which is concerned with the formulation of coloured w/o emulsion inks with pigments in the water phase, specifically excludes so-called "soluble" pigments such as lakes on the grounds of poor ink stability. These "soluble" pigments are distinguished by the presence of polar functional groups within the pigment's molecular structure which confer solubility in the reaction medium in which they are synthesised.

4. Notwithstanding the advantages of formulating w/o emulsion inks with pigments in the water phase, there is often an economic advantage to oil phase pigmentation because of the lower cost of pigment dispersants for use in the oil phase. Performance benefits achieved with water phase pigmentation can therefore be compromised by economic constraints.

There is therefore a need for an emulsion ink which does not demonstrate these shortcomings.

SUMMARY OF THE INVENTION

According to the present invention, an emulsion ink comprises a continuous oil phase; two or more dispersed liquid phases, one of which is a dispersed oil phase; and a solid material dispersed in the dispersed oil phase.

Surprisingly, it has been found that such inks can be formulated to have rheological properties suitable for use on a stencil or digital duplicator without experiencing the conflicting problems of tail-flooding or set-off. In fact, set-off may be significantly reduced with the inks of the present invention. Furthermore, the inks of the present invention tend to be less susceptible to rheology changes associated with changes in pigment concentration, and hence are capable of achieving uniform print quality consistently. Furthermore, inks may be formulated which provide a stable environment for polar pigments.

DESCRIPTION OF THE INVENTION

According to a first aspect of the present invention, at least one of the dispersed liquid phases is dispersed in another of the dispersed liquid phases, in the form of an emulsion, which in turn is dispersed in the continuous oil phase.

According to a second aspect of the present invention, a plurality of dispersed liquid phases are directly in contact, or form an interface with, the continuous oil phase.

According to a third aspect of the present invention, an emulsion ink comprises a plurality of dispersed liquid phases that directly contact the continuous phase, with one or more of those dispersed liquid phases comprising, dispersed therein, yet another dispersed liquid phase.

In the following, the present invention will be described primarily in the context of the first aspect of the invention. However, unless otherwise stated, formulation considerations, such as the types of materials to be used and their amounts, apply equally to the other aspects of the present invention.

The continuous phase is an oil phase which may comprise any oil that is known in the art to form the continuous phase of w/o emulsions. Suitable materials include, but are not restricted to, mineral oils including paraffin and naphthenic oils, distillates such as isoparaffins and spindle oil, synthetic hydrocarbons such as poly(isobutene), natural oils such as rapeseed and soya derivatives, silicones such as poly (dimethylsiloxane) and poly(phenyl-methylsiloxane), and other hydrocarbon solvents. The oil may be volatile or involatile or it may comprise a combination of volatile and involatile components.

The continuous oil phase will usually comprise a miscible emulsifying agent which is capable of yielding a w/o emulsion. Suitable emulsifying agents include, but are not restricted to, sorbitan esters such as sorbitan mono-oleate and sorbitan sesquioleate, phospholipids such as soya lecithin, polymeric surfactants such as ethylene oxide derivatives of higher alcohols, and silicone derivatives such as polyether modified polysiloxanes.

One of the dispersed liquid phases is an oil phase, preferably one which is a liquid under normal ambient conditions (18–22° C.) and which is not a film-forming solid material, unlike the resin emulsions incorporated in the water phase of inks described in EP-A-0609076. The dispersed oil phase may comprise any of the materials listed above for use as the continuous oil phase. Preferably the dispersed oil phase comprises a silicone oil when the continuous phase is a hydrocarbon oil.

Typically one of the dispersed phases will be a water phase and as such will contain water as a component, typically the principal component, for instance in the form of an aqueous solution.

When the ink is one comprising two or more dispersed liquid phases directly in contact with the continuous phase, the dispersed oil phase must be insoluble and immiscible with the continuous phase and the other dispersed phase, which is preferably a water phase.

When the ink is one comprising at least one dispersed liquid phase dispersed in another dispersed liquid phase, the overall dispersed phase preferably comprises an oil-in-water (o/w) emulsion and the overall ink comprises an oil-in-water (o/w/o) emulsion.

In order to form a dispersed liquid phase within another dispersed liquid phase it is usually necessary to include, in either of the dispersed liquid phases, an emulsifying agent.

In the preferred case, where an o/w emulsion is dispersed in the continuous oil phase, the emulsifying agent selected should be one capable of yielding an o/w emulsion. Such materials include, but are not restricted to, petroleum sulphonates, sodium salts of fatty acid esters, sulphosuccinates, water soluble salts of anionic polymers e.g. anionic acrylic resins, and phosphate esters. One example of a suitable commercially-available emulsifying agent is Dispex® N40, available from Ciba Specialty Chemicals.

As mentioned above, when the ink is one comprising a plurality of dispersed liquid phases which are directly in contact with the continuous phase, each of these dispersed phases may comprise a further, inner, phase dispersed therein. At least one of the dispersed liquid phases in contact with the continuous oil phase is an oil phase which is insoluble in and immiscible with the continuous oil phase. Suitable oils include any of those which may be used as a continuous oil phase, provided they are insoluble in and immiscible with the continuous oil phase in question. Preferably another dispersed liquid phase in contact with the continuous oil phase is a water phase. The materials for use as the dispersed, inner, phases are selected according to the nature of the phase in contact with the continuous oil phase.

In general, the weight ratio of the total dispersed liquid phase:continuous phase of the emulsion ink is typically within the range 90:10 to 10:90, preferably in the range 85:15 to 15:85, and more preferably in the range 80:20 to 20:80.

When, as is preferred, the ink is an o/w/o emulsion ink, typically the continuous oil phase comprises 10 to 80% by weight, the dispersed water phase comprises 20 to 85% by weight, and the dispersed oil phase comprises 0.05 (or less) to 50% by weight; preferably the continuous oil phase comprises 15 to 40% by weight, the dispersed water phase comprises 50 to 80% by weight, and the dispersed oil phase comprises 0.5 to 30% by weight; and more preferably the continuous oil phase comprises 20 to 40% by weight, the dispersed water phase comprises 45 to 75% by weight, and the dispersed oil phase comprises 1 to 15% by weight, of the weight of the total ink.

The ink of the present invention comprises a solid material dispersed in the dispersed oil phase. The dispersed solid material is substantially insoluble in the dispersed oil phase. The dispersed solid material may comprise any solid particulate matter, such as a pigment or other colouring agent, a filler, a resin, a wax, a phase-insoluble gellant, and mixtures thereof.

Suitable pigments and colouring agents are described below. Suitable inorganic fillers include talc, silica, calcium carbonate and barium sulphate. These materials may optionally have a surface treatment, e.g. stearate coated calcium carbonate, to aid dispersion within the dispersed oil phase. Suitable organic fillers include rice and corn starch. Suitable resins include acrylic resins, e.g. polymethylmethacrylate, vinyl resins, e.g. poly (vinyl acetate) and poly (vinyl chloride), polyamides, polyesters, polystyrenes and silicone polymers, as either homopolymers or copolymers. Suitable waxes include synthetic waxes, e.g. polyethylene and polypropylene, and natural waxes, e.g. carnauba wax. Suitable phase-insoluble gellants include bentonite clays, furned silica and layered silicates.

The amount of solid material included in the dispersed oil phase will depend on the nature of the oil and solid selected, and in particular the solid particle size, shape and surface area, and its dispersibility within the dispersed oil phase. For instance, when a solid material is to be included in the dispersed oil phase of an o/w/o emulsion ink, if the solid material is predispersed in the dispersed oil phase prior to formation of an o/w emulsion, typically it will be present in an amount of 1 to 55% by weight, preferably 10 to 50% by weight, of the dispersed oil phase. However, by co-dispersing the solid material and the oil in water prior to the addition of other water phase components, higher solid contents may be achieved, for instance as high as 99% by weight of the dispersed oil phase. Inks having a dispersed oil phase with a high solids content may be useful where the oil is required to act as a barrier to prevent adverse reactions between pigment and other ink components, for instance in the incorporation of lake pigments or the utilisation in the water phase of acid and alkaline pigments or fillers which are incompatible with the selected pH of the water phase.

The above ranges for the amount of solid included in the dispersed oil phase may be equally applicable to inks other than o/w/o emulsion inks.

The ink may comprise a colouring agent in any of its phases, ie. in the continuous phase or any of the dispersed liquid phases, or in more than one phase. For instance, if the ink is an o/w/o emulsion ink, a colouring agent may be included in the continuous oil phase and/or either or both of the dispersed liquid phases. Preferably, a colouring agent is included in one of the dispersed liquid phases, either in the dispersed water phase or the dispersed oil phase. One advantage of including a colouring agent in a dispersed oil phase, whether the ink is an o/w/o emulsion ink or not, is that a cheaper dispersant may be used than those conventionally required for dispersion in the water phase. In either case, the colouring agent effectively comprises a dispersed solid material, and if the colouring agent is present in the dispersed oil phase the ink may or may not comprise a further dispersed solid material in that phase or in at least one of its other dispersed liquid phases.

Suitable colouring agents may include, but are not restricted to, carbon black including furnace black, channel black and acetylene black, inorganic pigments such as titanium dioxide, aluminium and copper, and organic pigments including, but not restricted to azo pigments such as azo derivatives of acetoacetanilide, beta-naphthol, pyrazolones and the like, azo lake pigments, phthalocyanine compounds, quinacridones and dioxazines.

The ink may also contain in any one or more of its phases conventional additives such as resins, gellants, dispersants, water soluble salts (emulsion stabilisers), extending fillers, waxes and biocides.

Where, as is preferred, the ink comprises a dispersed water phase, this phase may comprise an antifreezing agent such as ethylene glycol, propylene glycol or glycerol; a gellant such as a salt of polyacrylic acid, a cellulose derivative e.g. a cellulose ether, gelatin, or an inorganic clay gellant; a resin emulsion; or any other additive conventionally included in the water phase of w/o emulsion inks, particularly those for use with stencil or digital duplicators. Preferably the dispersed water phase includes a gellant, typically in an amount of 0.1 to 5% by weight of the water phase.

According to yet another aspect of the present invention, an emulsion ink comprises a continuous oil phase having dispersed therein droplets of an oil-in-water (o/w) emulsion comprising an oil phase dispersed in a water phase, and a solid colouring agent dispersed in the water phase of the oil-in-water emulsion. Preferably the oil phase of the o/w emulsion contains dispersed solid material, as for the other aspects of the invention. The types of material and their amounts for use in this aspect of the invention are the same as those used for the other aspects described in detail above.

The preparation of the inks according to the present invention, and their separate phases, involves known techniques of dispersion and emulsification such as those referenced within the subsequent Examples. The preparation of the o/w emulsion to form a dispersed phase, and also the preparation of the final o/w/o ink emulsion, can be achieved by direct emulsification or inversion. Direct emulsification involves addition of the dispersed phase to the continuous phase. Inversion requires addition of the continuous phase to the dispersed phase.

The present invention is further illustrated by way of the following Examples.

EXAMPLES

Examples 1 and 2

The ink formulations are summarised in Table 1. Unless otherwise indicated, proportions of components are given as parts by weight of the overall ink formulation.

The continuous oil phase was prepared by blending the two naphthenic oils and sorbitan mono-oleate.

For the aqueous phase polyacrylic acid was dissolved in water and neutralised with dilute ammonia solution to form a gel.

A dispersion of CI Pigment Blue 1 (triarylmethane lake) was prepared by adding Surfynol® 440 and Dispex® N40 acrylic resin to water and then adding the pigment with high speed stirring to form a mill base. The dispersion was milled in a horizontal bead mill to achieve a fine dispersion.

For Example 1 the pigment dispersion was stirred into the polyacrylic acid gel to form a homogeneous water phase. The water phase was then added slowly to the rapidly stirred oil phase to form an emulsion ink.

For Example 2 talc (mean particle size 4–6 $\mu$m) was dispersed in silicone oil using a high speed stirrer. Dispex® N40 (1.9 parts of total ink) was blended with the polyacrylic gel (6.4 parts of total ink). This blend was then stirred at high speed whilst the talc dispersion in silicone oil was slowly added to form an o/w emulsion. Stirring was continued until the mixture had an even appearance.

The CI Pigment Blue 1 dispersion was blended with the remaining polyacrylic gel (49.2 parts of total ink), ethylene glycol and the o/w emulsion was then added with stirring to form the water phase. The oil phase was added to the rapidly stirred water phase to form an emulsion ink by an inversion process.

To evaluate the stability of the inks the change in emulsion structure during an accelerated ageing test was evaluated by use of a parallel plate plastometer (PPP). The use of this apparatus has been described by A. Voet in "American Ink Maker", Vol 28, 1950. This test method in effect measures the yield point of the ink at virtually zero shear rate. For emulsion inks changes in PPP value directly relate to changes in emulsion structure. Based on an approximate application of Arrhenius' Law, ageing of inks for 4 days at 70° C. is thought to replicate about 6 months ageing at ambient temperature.

Under the action of the accelerated ageing test ink Example 1 became fluid indicative of poor stability in line with prior art disclosures. However the o/w/o emulsion ink represented by Example 2 showed little change in structure.

Examples 3, 4 and 5

Using the same procedures as for Examples 1 and 2, inks represented by Examples 3, 4 and 5 were prepared. In this instance CI Pigment Blue 15:3 (copper phthalocyanine) was used with a sulphonated naphthalene-formaldehyde condensate (Dehscofix® 915/AS) as a pigment dispersant. The acrylic resin Dispex® N40 was used as the o/w emulsifying agent in Example 5.

Using an original with a large solid print area test prints were made with the inks at 30° C. on a Ricoh® model VT6000 digital duplicator. The prints were evaluated for evenness of ink coverage. Ink Example 3 with a relatively high pigment content showed even coverage whilst ink Example 4 with a lower pigment content gave uneven coverage. Ink Example 5 with the same pigment content as Example 4 gave an evenness of print quality to match Example 3. This change in flow properties is illustrated by the increase in creep test viscosity for Example 5 compared with Example 4.

Examples 6 and 7

Using the same procedures as for Examples 1 and 2, inks were formulated according to Examples 6 and 7 shown in Table 2 below. The polyacrylate gellant utilised in the previous examples was omitted from the formulation of the intermediate o/w emulsion, and no talc was included in the ink of Example 7.

The inks were evaluated using the same procedures as for the previous Examples. A comparison of the results obtained for Examples 6 and 7 shows that distinct benefits are achieved by incorporating a solid material (talc) within the dispersed oil phase of a 3-phase emulsion ink. In particular, the ink according to Example 6 had improved stability as compared to that of Example 7, with the latter showing phase separation after four days at 70° C. The ink according to Example 6 achieved a higher value on the creep test as compared to that of Example 7, and in fact the latter became unstable at higher applied boost strength values. Furthermore, in line with the creep test results, when a large solid print area was printed only the ink according to Example 6 achieved the required evenness of ink coverage, the ink of Example 7 did not.

TABLE 1

| | | EXAMPLES | | | | |
|---|---|---|---|---|---|---|
| COMPONENT | FUNCTION | 1 | 2 | 3 | 4 | 5 |
| Oil Phase | | | | | | |
| Naphthenic Oil 46 cSt | Mineral Oil | 9.6 | 9.6 | 9.6 | 9.6 | 9.6 |
| Naphthenic Oil 13 cSt | Mineral Oil | 6.4 | 6.4 | 6.4 | 6.4 | 6.4 |
| Sorbitan Mono-oleate | Emulsifying Agent | 4.0 | 4.0 | 4.0 | 4.0 | 4.0 |
| Water Phase | | | | | | |
| Water | | 67.0 | 49.4 | 65.2 | 68.2 | 53.8 |
| Polyacrylic Acid Ammonium Salt | Gellant | 0.6 | 0.5 | 0.5 | 0.7 | 0.6 |
| Ethylene Glycol | Antifreeze | 9.9 | 9.9 | 9.9 | 9.9 | 9.9 |
| Cl Pigment Blue 1 | Pigment | 2.5 | 2.5 | — | — | — |
| Anionic Acrylic Resin | Pigment Dispersant | 0.2 | 0.2 | — | — | — |
| Cl Pigment Blue 15:3 | Pigment | — | — | 4.0 | 1.1 | 1.1 |
| Anionic Surfactant | Pigment Dispersant | — | — | 0.4 | 0.1 | 0.1 |
| Nonionic Surfactant | Wetting Agent | 0.02 | 0.02 | 0.04 | 0.01 | 0.01 |
| O/W Emulsion Component | | | | | | |
| Silicone Oil 100 cSt | Dispersed Oil Phase | — | 5.9 | — | — | 4.8 |
| Talc | Filler In Dispersed Oil Phase | — | 3.5 | — | — | 2.9 |
| Anionic Acrylic Resin | o/w Emulsifying Agent | — | 1.9 | — | — | 1.5 |
| Water | | — | 6.33 | — | — | 5.24 |
| Polyacrylic Acid Ammonium Salt | Gellant | — | 0.07 | — | — | 0.06 |
| Ink Properties | | | | | | |
| Ink Structure/PPP | | Stiff Paste 1340 | Stiff Paste 2180 | Stiff Paste 1840 | Stift Paste 1840 | Stift Paste 1450 |
| Ink Structure/PPP after 7 days/70° C. | | Fluid 545 | Stiff Paste 2000 | Stiff Paste 1340 | Fluid 342 | Paste 882 |
| Viscosity Pa · s | | 1.393 | 2.134 | 1.414 | 0.871 | 1.074 |
| Creep Test Viscosity Pa · s measured immediately after application of boost stress | Boost Stress Pa 250 500 750 100 | — | — | 56.3 35.6 36.6 45.4 | 5.1 4.8 5.2 4.7 | 16.8 13.5 17.0 22.6 |
| Print Evenness at 30° C. | | Uneven | Even | Even | Uneven | Even |

TABLE 2

| COMPONENT | FUNCTION | EXAMPLES 6 | EXAMPLES 7 |
|---|---|---|---|
| Oil Phase | | | |
| Naphthenic Oil 46 cSt | Mineral Oil | 9.6 | 9.6 |
| Naphthenic Oil 13 cSt | Mineral Oil | 6.4 | 6.4 |
| Sorbitan Mono-oleate | Emulsifying Agent | 4.0 | 4.0 |
| Water Phase | | | |
| Water | | 49.4 | 49.4 |
| Polyacrylic Acid Ammonium Salt | Gellant | 0.5 | 0.5 |
| Ethylene Glycol | Antifreeze | 9.9 | 9.9 |
| Cl Pigment Blue 1 | Pigment | 2.5 | 2.5 |
| Dispex N40 Acrylic Resin | Pigment Dispersant | 0.2 | 0.2 |
| Cl Pigment Blue 15:3 | Pigment | — | — |
| Dehscofix 915/AS Surfactant | Pigment Dispersant | — | — |
| Nonionic Surfactant | Wetting Agent | 0.02 | 0.02 |
| O/W Emulsion Component | | | |
| Silicone Oil 100 cSt | Dispersed Oil Phase | 5.9 | 9.4 |
| Talc | Filler In Dispersed Oil Phase | 3.5 | — |
| Dispex N40 Acrylic Resin | o/w Emulsifying Agent | 0.9 | 0.9 |
| Water | | 7.3 | 7.3 |
| Polyacrylic Acid Ammonium Salt | Gellant | — | — |
| Ink Properties | | | |
| Ink Structure/PPP | | Stiff Paste 2180 | Stiff Paste 2360 |
| Ink Structure/PPP after 4 days/ 70° C. | | Stiff Paste 1340 | 1001 some phase separation |
| Viscosity Pa · s | | 0.829 | 0.712 |
| Creep Test Viscosity Pa · s measured immediately after application of boost stress | Boost Stress Pa 250 500 750 100 | 12.00 10.70 4.11 3.83 | 3.42 1.17 }Ink too unstable to }measure. |
| Print Evenness at 20° C. | | Even | Uneven |

What is claimed is:

1. An emulsion ink comprising:
   a continuous oil phase;
   two or more dispersed liquid phases, one of which is a dispersed oil phase; and
   a solid material dispersed in the dispersed oil phase.

2. An ink according to claim 1, wherein two or more dispersed liquid phases are in contact with the continuous oil phase.

3. An ink according to claim 1, wherein at least one dispersed liquid phase is further dispersed within another dispersed liquid phase.

4. An ink according to claim 1, wherein the dispersed oil phase comprises a silicone oil.

5. An ink according to claim 1, wherein at least one of the dispersed liquid phases is a water phase.

6. An ink according to claim 5, which comprises, dispersed in the continuous oil phase, droplets of an oil-in-water emulsion comprising an oil phase dispersed in a water phase.

7. An ink according to claim 6, wherein a coloring agent is present in the water phase of the oil-in-water emulsion.

8. An ink according to claim 7, wherein the coloring agent is an ako lake pigment.

9. An ink according to claim 6, wherein a coloring agent is present in the oil phase of the oil-in-water emulsion.

10. An ink according to claim 6, wherein the oil phase of the oil-in-water emulsion comprises a silicone oil.

11. An ink according to claim 5, wherein the water phase comprises a gellant.

12. An ink according to claim 1, wherein the dispersed solid material is selected from the group consisting of a filler, a resin a wax, a phase-insoluble gellant, and mixtures thereof.

13. An ink according to claim 1, wherein the dispersed solid material comprises a coloring agent.

14. An ink according to claim 1, wherein a colouring agent is present in the continuous oil phase.

15. An emulsion ink comprising a continuous oil phase having dispersed therein droplets of an oil-in-water emulsion comprising an oil phase dispersed in a water phase, and a solid coloring agent dispersed in the water phase of the oil-in-water emulsion.

16. An ink according to claim 15, wherein the dispersed oil phase comprises a silicone oil.

* * * * *